F. E. ANDERSON.
LOADING APPARATUS.
APPLICATION FILED NOV. 17, 1913.
1,125,928.
Patented Jan. 26, 1915.
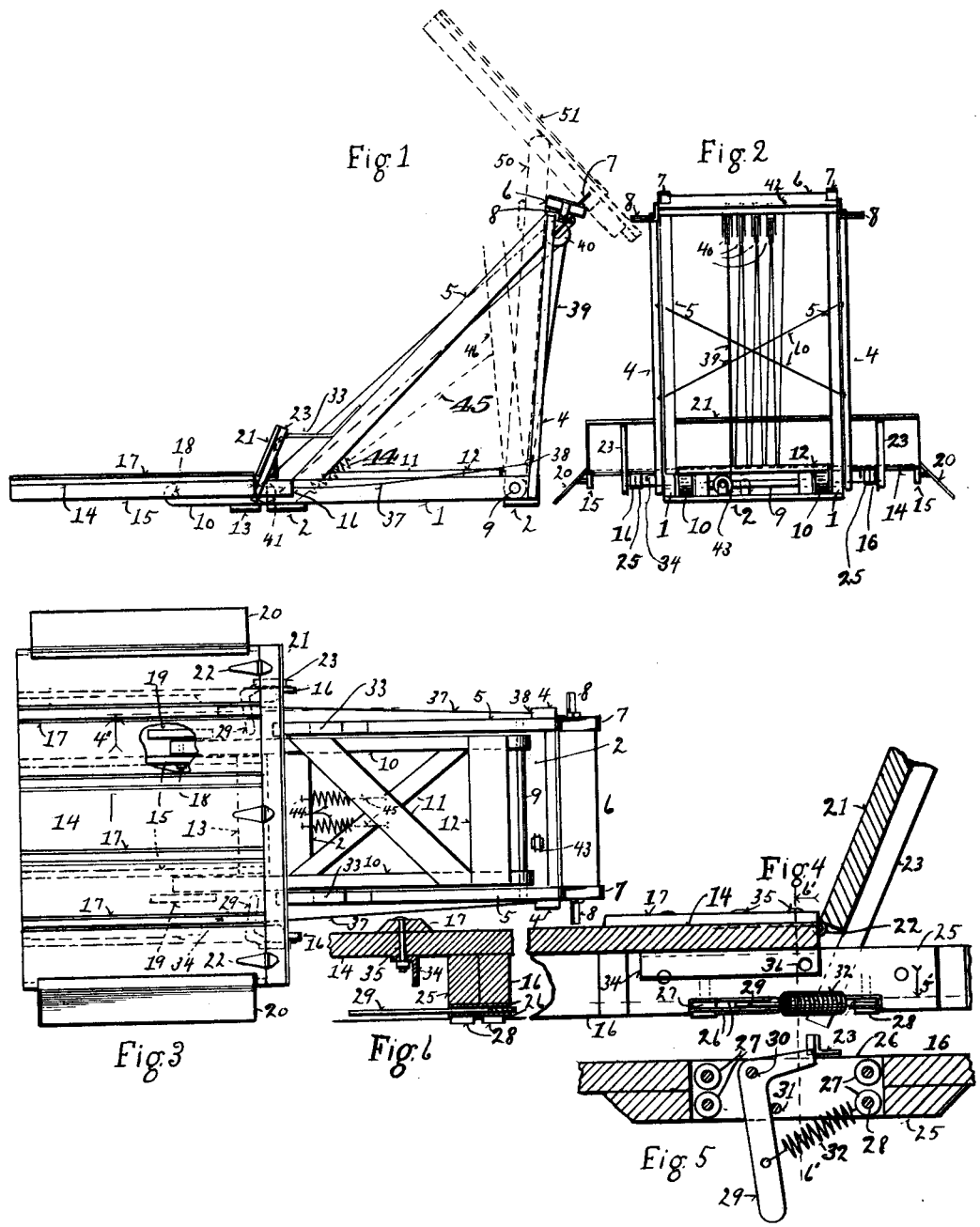
Witnesses
E. J. Rosen
J. M. Stark
Inventor
Fred E. Anderson
By J. A. Rosen Atty.

UNITED STATES PATENT OFFICE.

FRED E. ANDERSON, OF OSAGE CITY, KANSAS.

LOADING APPARATUS.

1,125,928. Specification of Letters Patent. Patented Jan. 26, 1915.

Application filed November 17, 1913. Serial No. 801,413.

*To all whom it may concern:*

Be it known that I, FRED E. ANDERSON, a citizen of the United States, residing at Osage City, in the county of Osage and State of Kansas, have invented certain new and useful Improvements in Loading Apparatus, of which the following is a specification.

My invention relates to apparatus for loading manure, dirt, etc., into vehicles.

It comprises a frame, alongside of which the vehicle is placed, a carrier, a frame pivoted in the main frame for raising the carrier from the ground and to bring the carrier above the vehicle or wagon bed, and certain devices for dumping the load in the carrier into the wagon bed; it also has a door along one side of the carrier for preventing the load therein from spilling until the final dump into the wagon bed is to be accomplished, with means for automatically operating the door.

It also comprises the parts, improvements, and combinations hereinafter set forth and claimed.

The object of my invention is to construct a simple, economical, durable, and easily operated apparatus of this kind, using few and simple parts.

In the drawings accompanying and forming part of this specification and in the description of the drawings, I have shown my invention in its preferred form and what I deem to be the best mode of applying the principles thereof; but it is to be understood that, within the scope of the appended claims, I contemplate changes in form, proportions, and materials, the transposition of parts, and the substitution of equivalent members, without departing from the spirit of my invention.

Figure 1 is a side elevation of a loading apparatus made in accordance with the principles of my invention, with a dotted outline of the carrier in final dumping position. Fig. 2 is a rear end elevation. Fig. 3 is a plan view. Fig. 4 is an enlarged sectional view on a plane indicated by the line 4' in Fig. 3. Fig. 5 is a sectional plan on a plane indicated by the line 5' in Fig. 4. Fig. 6 is a section on the line 6' in Fig. 4.

Similar reference characters indicate like or corresponding parts throughout the several views.

In constructing the main supporting frame, I lay out two beams 1, 1, extending from front to rear. By "front" I mean the end of the apparatus at which the carrier is located when down; and by "rear" I mean the end alongside of which the wagon is driven to receive the load. These terms as used in this specification are only relative. The two beams rest on cross beams 2, 2 at front and rear respectively. At the rear end are placed two vertical angle bars 4, 4, reinforced by means of diagonal braces 60. The two beams 5, 5 rest at their front ends on the front ends of the beams 1, 1, respectively, and thence extend upwardly and rearwardly, being supported at their rear ends by the uprights 4, 4, respectively, and supporting, in turn, the cross-piece 6. This cross-piece has two upwardly extending fingers 7, 7; and the two arms or fingers 8, 8 extend laterally from the outer sides of the diagonal beams 5, 5, respectively.

9 is the main pivot rod to which the carrier-raising frame is pivoted.

The carrier-raising frame is constructed as follows: The two beams 10, 10, pivoted on said rod 9, fit just inside the beams 1, 1, respectively, and are connected and the frame made rigid by means of the diagonal braces 11, the cross-piece 12 at their rear end and the cross-piece 13 on the under side of their front end.

The carrier has a flooring 14 supported on cross-pieces 15, 15, two of which are located just inside the beams 10, 10, respectively, and two of which are located outside those beams and spaced apart therefrom sufficiently so as to be entirely clear of the main supporting frame, they being indicated by the numerals 16, 16 and are of extra length as shown in the drawings. A short cross-piece is secured to the flooring just outside each beam 10, as shown at 19, 19; and the carrier is pivoted to the carrier-raising frame by means of bolts 18 passing through the front ends of the two beams 10, 10, respectively, and the adjacent cross-pieces. In Fig. 3 the flooring is partly broken away to show this arrangement.

The carrier platform is provided at each side with a run-way 20 to guide the load thereonto.

At the rear edge of the carrier platform is a door 21 hinged thereto by means of countersunk hinges 22, 22. On the rear or under side of the door are two angle bars 23, 23, one adjacent to each of the beams 16, 16 of extra length and projecting down alongside the same. 25 is a splice secured to each of these cross-pieces 16 to reinforce it and to provide in connection with the adjacent cross-piece a broader support for the plates 26, 26, which are spaced apart by means of spacers 27, 27, and secured to the cross-pieces by means of bolts or lag-screws 28, 28. Pivoted at 30 between the two plates is a latch 29, substantially L-shaped, which is adapted to extend, when in normal position, in the path of the angle bar 23, to hold the door in upright position. A stop 31 limits the movement of the latch, which is moved to its locking position by the extension spring 32. When the extended handle of the latch is moved against the tension of the spring (to the left as viewed in Fig. 5), the latch is thrown out of engagement with the angle bar 23 and permits the door to fall open and down until it rests upon the projecting ends of the extra-length cross-pieces 16, 16, in which position it is in a plane with the main platform of the carrier.

33, 33 are two guides secured to the diagonal beams 5, 5, respectively, for bringing the door to upright position when the carrier is lowered, in which case the spring automatically locks the latch and thus holds the door in upright position until the handles are again operated, as will be hereinafter described.

34, 34 are two short angle bars secured to the under side of the carrier platform at the rear edge thereof by any suitable means as by bolts 35, 35, and located outside the main supporting frame. Each of these angle bars has a hole 36 in its rear end, near the rear edge of the platform. To this hole is secured a chain 37, there being one such chain on each side of the main frame, the rear ends of the chains being secured to the main frame a little above and to the rear of the pivot bolt 9, the manner of securing being preferably by means of U-bolts secured to the respective uprights 4 as indicated at 38, 38.

Any suitable means may be used for elevating the carrier-raising frame and carrier. I have shown a simple form of compound pulleys. There are four pulleys 40 secured to the cross-beam 6 of the main supporting frame, and a similar number, 41, secured to the cross-beam 13 of the carrier-raising frame. A cable, secured at one end by passing it through the cross-beam 6 and knotting it, as shown at 42, is thence passed over the several pulleys, and thence to the pulley 43 secured to the cross-beam 2 at the rear of the main supporting frame, and thence outwardly in any convenient direction. The cable is indicated by the numeral 39. This arrangement of blocks and tackle affords a simple and efficient means for raising the carrier-raising frame.

The main supporting frame is so arranged that the beam 6 is a little to the rear of the vertical line extending through the pivot rod 9, and acts as a stop to limit the rearward movement of the carrier and its raising frame. It permits the carrier to overhang the bed of the wagon which is driven close to the rear end of the main frame.

17, 17 are merely cleats across the carrier platform to prevent slipping by the horses engaged in loading the carrier. The pivots 18, 18, are toward the rear of the platform, so that the front side is heavier both when loaded and when empty. As the carrier-raising frame and the carrier are raised on the main pivot, the tendency of the carrier is to tilt down at its forward end, but is prevented from doing so by reason of the pull of the chains 37. And while these chains do not need to hold the platform level (in fact, they permit a slight tilt toward the frame), yet they do hold the platform sufficiently straight to prevent the load from spilling. As the carrier approaches the limit of its movement, the chains 37 engage the arms 8, so that the continued movement of the raising-frame tilts the rear end of the carrier downward until the final position is reached as shown by the dotted outlines in Fig. 1, with the carrier at sufficient tilt to permit the load to slide off of it into the wagon bed. Also the final movement brings the handles of the lever latches 29 against the fingers 7, 7, thereby releasing the door which then falls down in line with the platform. This door prevents the load from spilling until the last moment when the carrier is in proper position to discharge its load. I also provide two rather strong coil extension springs 44 secured at one end to the cross-beam 2 at the forward end of the main supporting frame, and at the other to the diagonal braces 11 of the carrier-raising frame; though in fact part of the length of each connection may be a chain 45. These connections are of such length that they are loose or slack when the carrier is down, are taut when the raising frame is in about the position indicated by the dotted outline 46, just before the frame has come to vertical position, and are under tension during the further rearward travel of the carrier-raising frame. Their purpose is to pull back the carrier-raising frame immediately upon the discharge of the load from the carrier, at least to a point in front of the "dead center," after which the weight of the carrier and raising frame will bring the parts back to proper position with the carrier down and ready to receive another load. Of course, the springs should be strong enough to overcome both the weight of the frame and carrier and the friction. The carrier may be let down easily by simply paying out the cable. On such return, the door is automatically closed by striking against the guides 33, 33.

It will now be understood that the operation of the several parts is entirely automatic, the only action on the part of the operator being to pull the cable to lift the carrier, and the paying out of the cable to effect an easy return.

What I claim is:

1. In combination, two horizontal parallel beams spaced apart, cross-beams secured to the underside of the longitudinal beams at the respective ends thereof, two uprights supported upon the rear end of said longitudinal beams, two diagonal beams secured to and extending from the front ends of said longitudinal beams to the upper ends of the uprights respectively, a cross-beam secured to and extending between the upper ends of said diagonal beams, arms extending laterally from said diagonal beams, fingers extending upwardly from said last-named cross-beam, two longitudinal beams fitting inside the first-named longitudinal beams and pivoted thereto at their rear ends, cross-beams and diagonal braces connecting said last-described longitudinal beams, said last-described longitudinal beams extending out in front of the first-mentioned longitudinal beams, a carrier platform pivoted to the front end of the last-described longitudinal beams, a door hinged to the rear side of said platform, two latches pivoted to the platform for holding the door in upright position, each latch having a lever handle, a chain at one end secured to the rear edge of the platform on each side of the first-named longitudinal beams and at the other end secured to the upright above and back of the first-named pivot so as to maintain the platform in substantially horizontal position, said laterally-extending arms being in the paths of the respective chains so that said chains engage said arms before the carrier has made its full movement, and said fingers being in the paths of the respective lever handles so as to disengage said latches at the end of said movement, together with means for raising the second-described longitudinal beams on their pivot.

2. In combination, a main supporting frame, a carrier raising frame pivoted at its rear end to the rear end of the main frame, a carrier pivoted to the front end of the raising frame, the front end of the carrier being heavier than the rear end, a chain extending between the rear end of the carrier and the main frame and capable of maintaining the carrier in approximately horizontal position while being raised on the raising frame, means for raising the raising frame, a door hinged to the front end of the carrier, a latch for locking the door in upright position, a spring for restoring the latch to normal locking position, the main frame being provided with a stop to stop the raising frame slightly rearwardly of its vertical position, with fingers to disengage the latch at the end of the travel of said raising frame, and with arms to engage the chain a little before the end of such travel so as to tilt the carrier and discharge the load.

3. In apparatus of the kind described, the combination with a main frame, a carrier raising frame pivoted to the main frame, a carrier pivoted to the raising frame, means for raising the raising frame, chains extending between the carrier and the main frame for maintaining the carrier in approximately horizontal position, a stop on the main frame, for limiting the travel of the raising frame and carrier, arms on the main frame for engaging the chains before the end of the travel to tilt the carrier and discharge the load.

4. In apparatus of the kind described, the combination of a main frame, a carrier raising frame pivoted thereto, a carrier pivoted to the raising frame, said raising frame being adapted to raise the carrier from its low position at one end of the main frame to its high position at the other end of the main frame, means for raising the raising frame, means for maintaining the carrier in substantially horizontal position while being raised, a stop to limit the raising movement of the raising frame, and a means automatically operable by the last raising movement of the raising frame for tilting the carrier to discharge its load.

5. In apparatus of the kind described, the combination of a main frame, a carrier raising frame pivoted thereto, a carrier pivoted to the raising frame, said raising frame being capable of lifting the carrier from its low position at one end of the main frame to its high position at the other end, means for raising the raising frame, means for maintaining the carrier in substantially horizontal position during the lifting movement, a stop to limit the lifting movement, and a means operable by the movement of the raising frame for tilting the carrier at the end of the lifting movement to discharge its load.

6. In apparatus of the kind described, the combination of a main frame, a carrier, a raising frame pivoted at one end to one end of the main frame and at the other end to the carrier and adapted to oscillate between a substantially horizontal position and a position slightly beyond a vertical position, a stop for limiting the lifting movement of the raising frame, means for lifting the raising frame, means for maintaining the carrier in substantially horizontal position during the lifting movement, means operable by the movement of the raising frame for tilting the carrier at the end of the lifting movement for discharging its load, and a spring for initially pulling back the raising frame from its extreme load-discharging position to a position from which it will fall by gravity to its horizontal position.

7. In apparatus of the kind described, the combination of a main frame, a carrier-raising frame pivoted thereto, a carrier pivoted to the raising frame, means for raising the raising frame, means for maintaining the carrier in substantially horizontal position during the raising, means for automatically tilting the carrier at the end of the travel, a stop for limiting the travel of the raising frame, a door hinged to the rear end of the carrier, a latch for holding the door in upright position, means for automatically unlocking the latch at the end of said travel, and means for automatically locking the door in upright position on its return to its lower position.

8. In apparatus of the kind described, the combination of a main frame, a carrier raising frame pivoted thereto, a carrier pivoted to the raising frame, said raising frame being capable of lifting the carrier from its low position at one end of the main frame to its high position at the other end, means for raising the raising frame, means for maintaining the carrier in substantially horizontal position during the lifting movement, a stop to limit the lifting movement, a means for tilting the carrier at the end of the lifting movement to discharge its load, a door hinged to the rear end of the carrier, means for supporting said door substantially in a plane with the carrier floor, and means for holding the door in elevated position when the carrier is in its low position.

9. In apparatus of the kind described, the combination of a main frame, a carrier raising frame pivoted thereto, a carrier pivoted to the raising frame, said raising frame being capable of lifting the carrier from its low position at one end of the main frame to its high position at the other end, means for raising the raising frame, means for maintaining the carrier in substantially horizontal position during the lifting movement, a stop to limit the lifting movement, a means for tilting the carrier at the end of the lifting movement to discharge its load, a door hinged to the rear end of the carrier, means for supporting the door substantially in a plane with the carrier floor, and means for restoring the door to and holding it in elevated position when the carrier is returned to its low position.

10. In apparatus of the kind described, the combination of a main frame, a carrier-raising frame pivoted thereto, a carrier pivoted to the raising frame, means for raising the carrier-raising frame, a door hinged to the rear end of the carrier, a spring-pressed latch for holding the door in upright position, means for holding the carrier in substantially horizontal position, means for tilting the carrier to discharge its load at the end of its upward travel, a stop on the main frame for limiting the travel of the raising frame, and means on the main frame for unlocking said latch.

In testimony whereof I have affixed my signature in presence of two witnesses.

FRED E. ANDERSON.

Witnesses:
C. J. ROSEN,
J. M. STARK.

Copies of this patent may be obtained for five cents each, by addressing the "Commissioner of Patents, Washington, D. C."